United States Patent
Wu et al.

(10) Patent No.: US 7,046,629 B2
(45) Date of Patent: May 16, 2006

(54) METHOD FOR CONTROLLING NUMBER OF ADDRESSES IN ADDRESS TABLE OF SWITCH

(75) Inventors: Yu-Chin Wu, Hsinchu (TW); Ying-Hui Huang, Hsinchu (TW)

(73) Assignee: D-Link Corporation, Hsinchu (TW)

( * ) Notice: Subject to any disclaimer, the term of this patent is extended or adjusted under 35 U.S.C. 154(b) by 930 days.

(21) Appl. No.: 09/962,157

(22) Filed: Sep. 26, 2001

(65) Prior Publication Data
US 2003/0058859 A1    Mar. 27, 2003

(51) Int. Cl.
*G06F 11/00* (2006.01)
*H04L 12/28* (2006.01)

(52) U.S. Cl. ............ 370/230.1; 370/235; 370/397; 709/238; 709/242

(58) Field of Classification Search ........... 370/255, 370/392, 254, 252, 389, 399, 397, 230.1, 370/235; 709/238, 236, 242
See application file for complete search history.

(56) References Cited

U.S. PATENT DOCUMENTS
6,308,218 B1 *   10/2001   Vasa  .................. 709/238

* cited by examiner

*Primary Examiner*—Afsar Qureshi
(74) *Attorney, Agent, or Firm*—Bacon & Thomas, PLLC

(57) ABSTRACT

A method for controlling a number of addresses in an address table of a switch in a network system includes the steps of adding a control mechanism in a learning mode of the switch; enabling one of a plurality of ports of the switch to detect a number of learned addresses in the address table; and locking the address table to stop learning and discard subsequently received packets having unmatched addresses if the number of learned addresses being detected has exceeded a predetermined maximum number of learnable addresses of the address table, thereby preventing the address table from being completely occupied by a number of abnormal packets.

7 Claims, 3 Drawing Sheets

METHOD FOR CONTROLLING NUMBER OF ADDRESSES IN ADDRESS TABLE OF SWITCH

FIELD OF THE INVENTION

The present invention relates to a network, and more particularly to a method for controlling a number of addresses in an address table of a switch.

BACKGROUND OF THE INVENTION

A conventional Ethernet system is shown in FIG. 1 wherein different Ethernets 1 and 2 (i.e., in different regions) are interconnected by at least one switch 3. Switch 3 is implemented as a network device comprising a plurality of ports. Whether the switch is comprised of a plurality of network devices or a single switch, the switch is still referred to as a "switch" throughout the specification as long as the communication means between switches is implemented as common Bridge Protocol Data Units (BPDUs).

Switch 3 acts to monitor data packets communicated between different network regions. When switch 3 has received a packet from a certain network, the controller of switch 3 may compare the destination address and source address of the packet with addresses recorded in address table 31 of a database. If the destination address of the packet is the same as that of terminal 4 in the same network, the packet is discarded (i.e., no transmission) for filtering the packet transmission. Otherwise, the source address of the packet is dynamically recorded in address table 31 if the source address of the packet is not found in the address table 31. In other words, the address table of the switch is employed to determine the path of packet switching. Currently, the setting procedure for an address table is implemented by adding a plurality of messages in a long MAC address. Typically, the user first enters such messages into terminals prior to downloading to the switch. Alternatively, the user may sequentially set a physical address and message thereof through the network management protocol. Such entry of messages and/or manual setting of addresses is disadvantageous because it is time consuming and prone to error.

Moreover, a typical switch has a learning capability. Hence, a switch administrator may not perform a locking on address table. As a result, the source address of an unauthorized terminal may occupy space in the address table without permission. Further, when the destination address of a packet received by the switch is not recorded in the address table (i.e., not learned by the switch), the packet may be sent to any of the other remaining ports. As a result, available bandwidth of switch is reduced.

Recently, applications of networks have extended to communities and families. In a typical example, each family having address table access capability is coupled to a port of a switch provided by the network system provider. Hence, a plurality of computers installed in each family may access the Ethernet through the port. However, it is a disadvantageous condition that a significant number of packets may be sent to the network for processing when there is no limitation (or no suitable limiting) by the network system provider on the number of online computers from one user end. As a result, the address table of switch may be completely occupied simultaneously, which in turn reduces available bandwidth. In an extreme condition, a large number of packets having different address tables created by a user may occupy all available space of the address table of the switch connected to the user. Worse, an undesired propagation of the packets is performed, resulting in a reduction of available bandwidth. This means that bandwidth available to other users is reduced or even services therefor are interrupted in a worst condition.

Address learning techniques of the current switch are comprised of the following:

1. A self learning capability of address provided by network administration software, which is advantageous for limiting a size of the address table of switch, but disadvantageous because it is unable to limit or adjust a size of the address table of the respective port.

2. An address learning capability provided by hardware of the switch, wherein each port only learns a received first source address, which is disadvantageous because it is impossible to adjust and control hardware of the switch when the switch is learning the number of addresses of each port. Further, an auto aging out timer may be provided, compounding the problem of adjusting and controlling the switch. If, for example, ten computers are owned by a family, only one computer is allowed to access network, and therefore, the switch can only learn one source address. As a result, only one computer may access the Ethernet during online service and the switch may delete addresses of the other computers unless they are used frequently.

Thus, it is desirable to provide a novel method for controlling number of address in address table of switch in order to overcome the above drawbacks of prior art.

SUMMARY OF THE INVENTION

It is therefore an object of the present invention to provide a method for controlling the number of addresses in an address table of a switch in a network system. The method comprises the steps of a) adding a control mechanism in a learning mode of the switch; b) enabling one of a plurality of ports of the switch to detect a number of learned addresses in the address table: c) determining whether the number of learned addresses has exceeded a predetermined maximum number of learnable addresses of the address table; and d) locking the address table to stop learning and discard subsequently received packets having unmatched addresses if a result in the step c) is positive, thereby preventing a number of the packets from completely occupying the address table of the switch in addition to increasing the available bandwidth for the switch and the efficiency and safety of network administration.

In one aspect of the present invention, in response to the received packet, one of the ports of the switch performs the following steps for processing the received packet: e) comparing an address of the received packet and an address recorded in the address table; f) determining whether the address of the received packet is matched with one of previously learned and recorded addresses in the address table; g) performing an exchange of the packet if a result in step f) is positive; h) if the result in step f) is negative and the number of learned addresses in the address table has not exceeded the predetermined maximum number of learnable addresses of the port, recording a source address and associated information in the address table and increasing the number of learned addresses in the address table by one until the number of learned addresses in the address table has exceeded the predetermined maximum number of learnable addresses of the port; and i) discarding subsequently received packets having unmatched addresses by performing no exchange of the packet. Therefore, the invention may set the number of learnable addresses of each port for effectively controlling the number of users accessing various ports through network administration software.

In another aspect of the present invention, an auto aging out timer mechanism is added to the switch, wherein information about one of a plurality of addresses of the address table is removed from the switch when the information has not been used during a predetermined period of time, after which space is reserved for one of the ports to learn a new address, add the same, and regularly automatically update the network system.

The above and other objects, features and advantages of the present invention will become apparent from the following detailed description taken with the accompanying drawings.

DETAILED DESCRIPTION OF THE PREFERRED EMBODIMENTS

As stated above, when a packet from a certain network is received by a typical switch, the controller of the switch compares the destination address and source address of the packet with an address recorded in an address table of a database and sends the packet to a terminal having the destination address. Otherwise, if no matched destination address is found, the switch may flood the destination address to each online port. If there is a reply from a terminal having the destination address with respect to the packet, the switch may record the destination address the in address table of the database. If the source address of the packet is not found in the address table, the switch may also record the source address in the address table. By utilizing this learning technique, the switch is capable of maintaining an integrity and accuracy of the address table. Further, the invention may provide required data to terminals connected to the network for accessing the network based on information contained in the address table and thus, update data in other switches.

Figure 1:
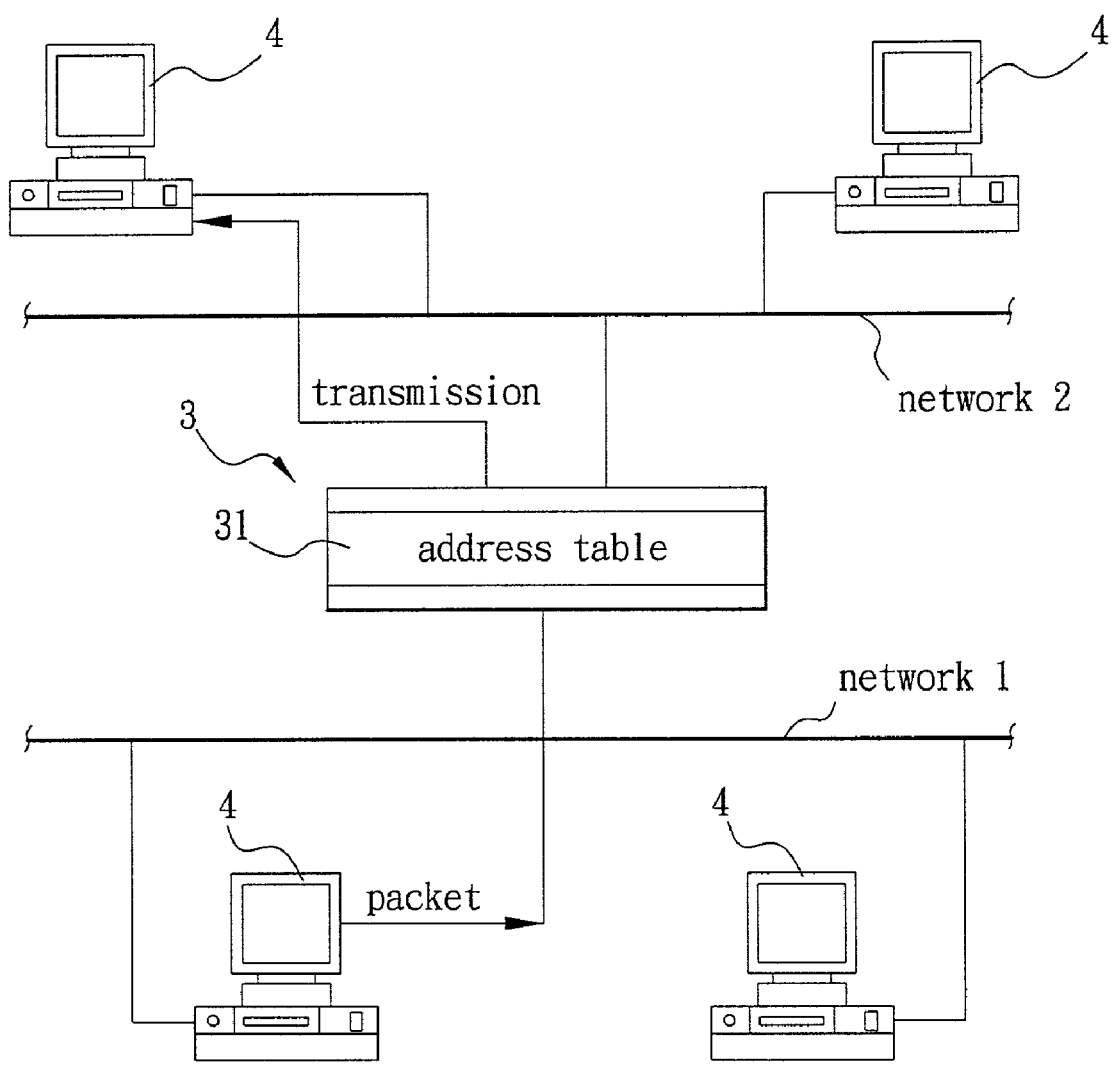
FIG. 1 presents schematically the interconnection between two different Ethernet through a switch according to prior art.
Figure 2:
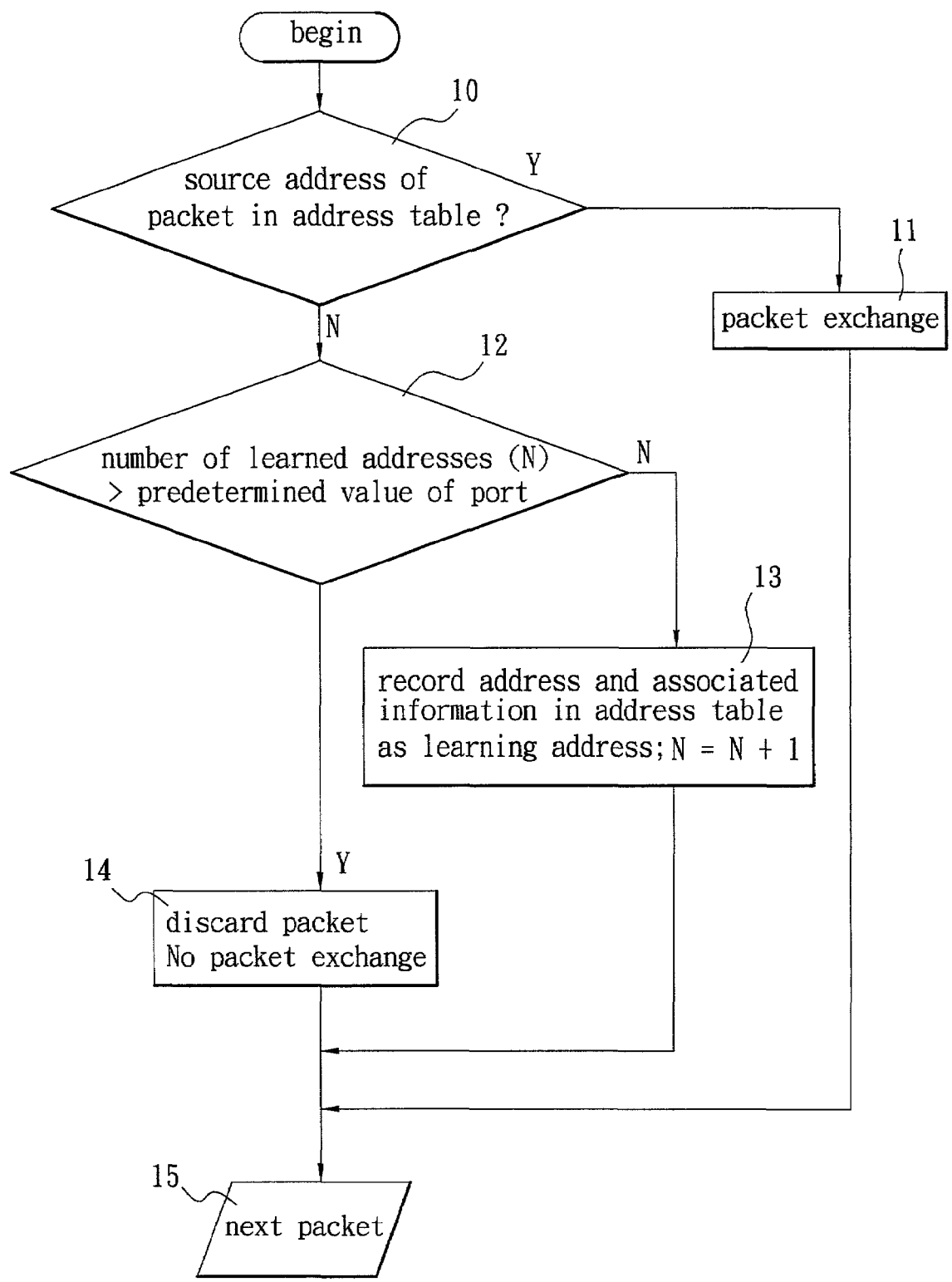
FIG. 2 is a flow chart illustrating a control mechanism in a learning mode of a switch according to the invention.

Referring to FIG. 2, there is shown a flow chart illustrating an added control mechanism for the above learning feature of the switch according to the invention. Any one of ports of switch may perform the following steps for processing an address of the received packet:

In step 10, a comparison is made with respect to the address of a received packet and the address is recorded in the address table in order to determine whether the address of the received packet is the same as an address previously learned and recorded in the address table. If yes, the process goes to step 11. Otherwise, the process goes to step 12.

In step 11, the packet is exchanged prior to jumping to step 15.

In step 12, it is determined whether the number of learned addresses (N) in the address table has exceeded a predetermined maximum number of learnable addresses ($N_{mAx}$) of the port. If yes, the process goes to step 14. Otherwise, the process goes to step 13.

In step 13, the source address and associated information are recorded in the address table and N is increased by one (i.e., N=N+1). The process then goes to step 15.

In step 14, the address table is locked to stop learning, and then subsequently received packets having undesired addresses are discarded and no exchange is performed on the packet.

In step 15, the process continues to receive packets from the network and processes the same as above.

Therefore, the invention may set the number of learnable addresses of each port for effectively controlling the number of users accessing various ports through the network administration software. This can prevent a significant number of packets from being sent to ports of the switch. As a result, the address table is not occupied completely, available bandwidth for the switch is increased, and efficiency and safety of network administration is significantly improved.

Figure 3:
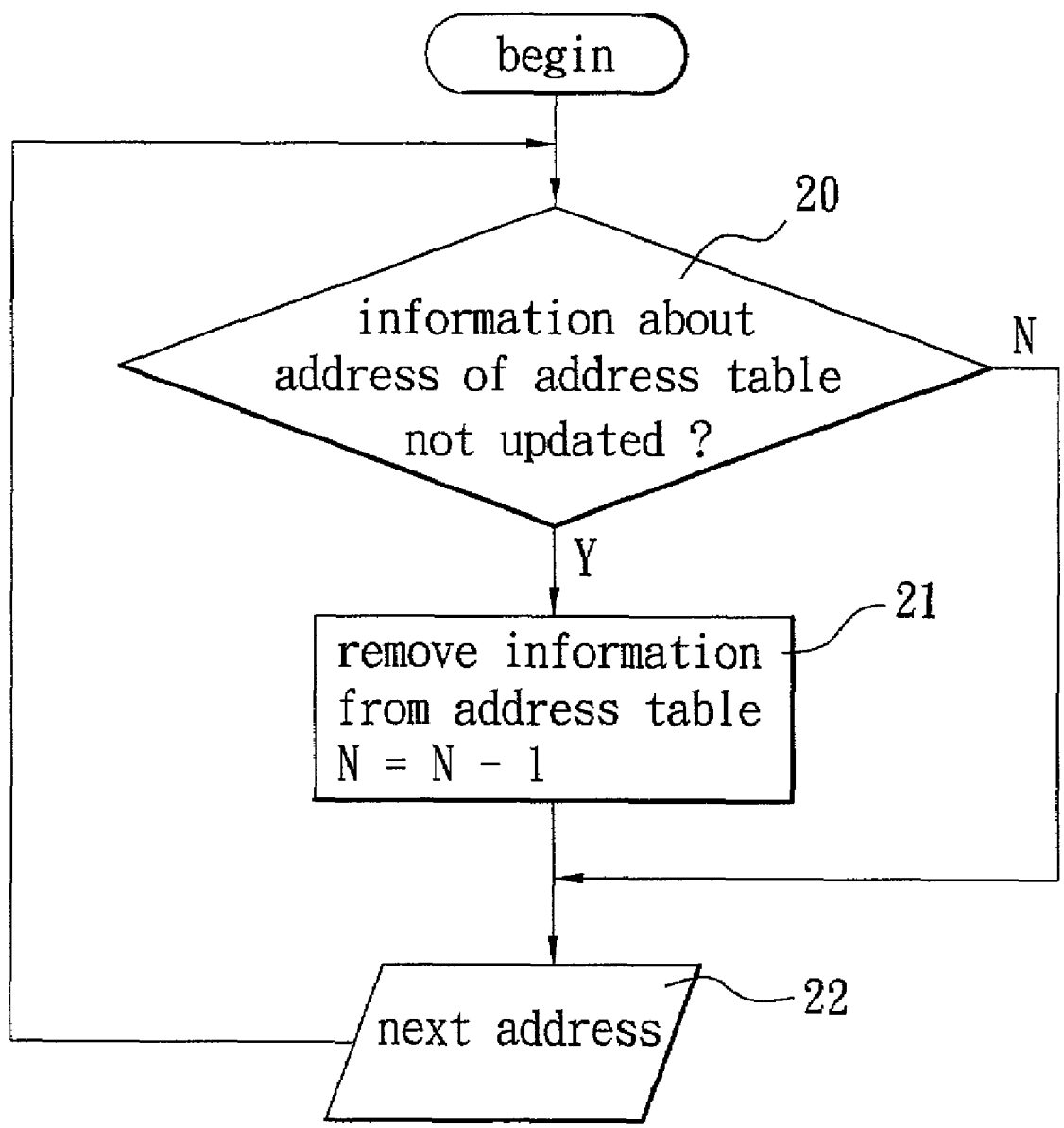
FIG. 3 is a flow chart illustrating an auto aging out timer mechanism in the learning mode of the switch according to the invention.

Referring to FIG. 3, there is shown a flow chart illustrating an auto aging out timer mechanism added to the above learning feature of the switch according to the invention. The switch may perform the following steps with respect to addresses of address table based on the timer:

In step 20, it is determined whether information about one address in the address table has been updated during a predetermined period of time. If no, it means that such information may be inconsistent with the condition of the current network, and thus the process goes to step 21. Otherwise, the process goes to step 22.

In step 21, the existing address information is removed from the address table directly by the switch and decreased N by one (i.e., N=N-1). Hence, the port may continue learning and recording new addresses.

In step 22, the switch continues to process information about an immediate next address of the address table until the auto aging out timer for information about all addresses of the address table has been processed during the predetermined period of time.

In brief, the switch may remove corresponding address information from the address table when information about any address of the address table has not been used during a specified period of time. This can reserve space for port to learn a new address. Further, the new address is added to the address table. This can regularly automatically update the condition of network.

While the invention has been described by means of specific embodiments, numerous modifications and variations could be made thereto by those skilled in the art without departing from the scope and spirit of the invention set forth in the claims.

What is claimed is:

1. A method for controlling number of a addresses in an address table of a switch in a network system, the method comprising the steps of:
   a) adding a control mechanism in a learning mode of the switch;
   b) enabling one of a plurality of ports of the switch to detect a number of learned addresses in the address table;
   c) determining whether the number of learned addresses has exceeded a predetermined maximum number of learnable addresses of the address table; and
   d) locking the address table to stop learning and discard subsequently received packets having unmatched addresses if a result in step c) is positive, thereby preventing a number of the packets from completely occupying the address table of the switch.

2. The method of claim 1, wherein information about one of a plurality of addresses of the address table is removed therefrom when the information has not been used during a predetermined period of time for reserving space for one of the ports to learn a new address and to regularly automatically update the network system.

3. The method of claim 2, wherein in response to the received packet, one of the ports of the switch performs the following steps for processing the received packet:
   e) comparing an address of the received packet and an address recorded in the address table;
   f) determining whether the address of the received packet matches one of previously learned and recorded addresses in the address table;
   g) determining whether the number of learned addresses (N) in the address table has exceeded the predetermined maximum number of learnable addresses ($N_{MAX}$) of the port if a result in step f) is negative;
   h) recording a source address and associated information in the address table and increasing N by one if a result in step g) is negative; and
   i) continuing to receive packets from the network and processing the according to steps e) to i).

4. The method of claim 3, further comprising the steps of locking the address table to stop learning, discarding subsequently received packets having unmatched addresses, and performing no exchange on the packets if the result in the step g) is positive.

5. The method of claim 3, further comprising the step of performing an exchange on the packets if a result in step f) is positive.

6. The method of claim 3, wherein the switch performs the steps with respect to information about the addresses of the address table based on a timer thereof:
   j) determining whether the information about the address in the address table has been updated during a predetermined period of time;
   k) assuming the information is inconsistent with a condition of the current network system, removing the information from the address table by the switch, and decreasing N by one if a result in step j) is that the address table has not been updated; and
   l) enabling the port to continue learning and recording processes of the new addresses; and
   m) continuing to process information about a next one of the addresses of the address table until an auto aging out timer for information about all of the addresses of the address table has been processed during the predetermined period of time.

7. The method of claim 6, wherein if a result in step j) is positive, repeating steps j) to m) for a next one of the addresses of the address table.

* * * * *